(12) United States Patent
Motoyoshi

(10) Patent No.: US 11,431,604 B2
(45) Date of Patent: Aug. 30, 2022

(54) TERMINAL APPARATUS, SWITCH, NETWORK SYSTEM, TEST METHOD AND PROGRAM

(71) Applicant: NEC Corporation, Tokyo (JP)

(72) Inventor: Shinichiro Motoyoshi, Tokyo (JP)

(73) Assignee: NEC CORPORATION, Tokyo (JP)

(*) Notice: Subject to any disclaimer, the term of this patent is extended or adjusted under 35 U.S.C. 154(b) by 85 days.

(21) Appl. No.: 16/976,585

(22) PCT Filed: Mar. 6, 2019

(86) PCT No.: PCT/JP2019/008855
§ 371 (c)(1),
(2) Date: Aug. 28, 2020

(87) PCT Pub. No.: WO2019/172310
PCT Pub. Date: Sep. 12, 2019

(65) Prior Publication Data
US 2021/0051094 A1     Feb. 18, 2021

(30) Foreign Application Priority Data

Mar. 7, 2018 (JP) .............................. JP2018-041047

(51) Int. Cl.
*H04L 43/50* (2022.01)
*H04L 12/28* (2006.01)
(Continued)

(52) U.S. Cl.
CPC .............. *H04L 43/50* (2013.01); *H04L 12/28* (2013.01); *H04L 12/40182* (2013.01);
(Continued)

(58) Field of Classification Search
CPC ... H04L 43/50; H04L 43/10; H04L 12/40182; H04L 12/28; H04L 45/245; H04L 45/745; H04L 49/70
See application file for complete search history.

(56) References Cited

U.S. PATENT DOCUMENTS 7,768,928 B2 * 8/2010 Harel .................. H04L 41/26
370/241.1
2008/0016402 A1    1/2008 Harel et al.
(Continued)

FOREIGN PATENT DOCUMENTS

JP    H09-270822 A    10/1997
JP    2007-243466 A    9/2007
(Continued)

OTHER PUBLICATIONS

Japanese Office Action for JP Application No. 2020-505077 dated Aug. 17, 2021 with English Translation.
(Continued)

*Primary Examiner* — Min Jung
(74) *Attorney, Agent, or Firm* — Sughrue Mion, PLLC

(57) ABSTRACT

A terminal apparatus, comprises an inspection execution part that executes an inspection by transmitting a test packet to a prescribed destination apparatus reached via a plurality of logical links, the logical link being configured by a switch having a function of aggregating a plurality of physical links between the switch and an adjacent switch to use the physical links as a logical link, and a test packet creation part that creates, based on a rule of selecting a physical link as a component of the logical link by the switch, a plurality of kinds of test packets for which a transmission source address(es) of the test packet(s) is(are) so rewritten to enable
(Continued)

confirmation of normality of the plurality of physical links between the terminal apparatus and the prescribed destination apparatus.

18 Claims, 11 Drawing Sheets

(51) Int. Cl.
*H04L 45/24* (2022.01)
*H04L 45/745* (2022.01)
*H04L 49/00* (2022.01)
*H04L 12/40* (2006.01)
*H04L 43/10* (2022.01)

(52) U.S. Cl.
CPC ............ *H04L 43/10* (2013.01); *H04L 45/245* (2013.01); *H04L 45/745* (2013.01); *H04L 49/70* (2013.01)

(56) References Cited

U.S. PATENT DOCUMENTS

| | | |
|---|---|---|
| 2008/0037544 A1 | 2/2008 | Yano et al. |
| 2009/0067324 A1* | 3/2009 | Licardie ................. H04L 45/22 370/225 |
| 2011/0093579 A1 | 4/2011 | Koizumi et al. |
| 2013/0198570 A1 | 8/2013 | Nishi |
| 2015/0103673 A1 | 4/2015 | Shimada et al. |
| 2019/0007288 A1* | 1/2019 | Wen .................... H04L 43/0811 |

FOREIGN PATENT DOCUMENTS

| | | |
|---|---|---|
| JP | 2008-048010 A | 2/2008 |
| JP | 2009-543500 A | 12/2009 |
| JP | 2010-114657 A | 5/2010 |
| JP | 2011-091464 A | 5/2011 |
| JP | 2013-046164 A | 3/2013 |
| JP | 2013-157957 A | 8/2013 |
| JP | 2015-002413 A | 1/2015 |

OTHER PUBLICATIONS

International Search Report for PCT Application No. PCT/JP2019/008855, dated May 21, 2019.

\* cited by examiner

FIG. 6

| TRANSMISSION DESTINATION ADDRESS | TRANSMISSION SOURCE ADDRESS | SECTION 1 | SECTION 2 | SECTION 3 |
|---|---|---|---|---|
| 10.0.0.1 | 192.168.0.3 | 1 | 1 | 1 |
| 10.0.0.1 | 192.168.0.18 | 1 | 1 | 2 |
| 10.0.0.1 | 192.168.0.2 | 1 | 2 | 1 |
| 10.0.0.1 | 192.168.0.1 | 1 | 2 | 2 |
| 10.0.0.1 | 192.168.0.7 | 2 | 1 | 1 |
| 10.0.0.1 | 192.168.0.8 | 2 | 1 | 2 |
| 10.0.0.1 | 192.168.0.6 | 2 | 2 | 1 |
| 10.0.0.1 | 192.168.0.4 | 2 | 2 | 2 |

FIG. 8

| TRANSMISSION DESTINATION ADDRESS | TRANSMISSION SOURCE ADDRESS | SECTION 1 | SECTION 2 | SECTION 3 | TEST RESULT |
|---|---|---|---|---|---|
| 10.0.0.1 | 192.168.0.3 | 1 | 1 | 1 | OK |
| 10.0.0.1 | 192.168.0.18 | 1 | 1 | 2 | OK |
| 10.0.0.1 | 192.168.0.2 | 1 | 2 | 1 | NG |
| 10.0.0.1 | 192.168.0.1 | 1 | 2 | 2 | NG |
| 10.0.0.1 | 192.168.0.7 | 2 | 1 | 1 | OK |
| 10.0.0.1 | 192.168.0.8 | 2 | 1 | 2 | OK |
| 10.0.0.1 | 192.168.0.6 | 2 | 2 | 1 | NG |
| 10.0.0.1 | 192.168.0.4 | 2 | 2 | 2 | NG |

TERMINAL APPARATUS, SWITCH, NETWORK SYSTEM, TEST METHOD AND PROGRAM

CROSS-REFERENCE TO RELATED APPLICATIONS

This application is a National Stage Entry of PCT/JP2019/008855 filed on Mar. 6, 2019, which claims priority from Japanese Patent Application 2018-041047 filed on Mar. 7, 2018, the contents of all of which are incorporated herein by reference, in their entirety. The present invention relates to a terminal apparatus, a switch, a network system, a test method and a program.

BACKGROUND

Field

In recent years the demand for ensuring reliability of network is increasing, and it is an urgent issue to promptly identify a fault location when a certain path failure has occurred. In order to ensure reliability, means by which a path is configured in a redundant manner may be used. As a method, a link aggregation function (LAG function: IEEE 802.3ad) may be enumerated in a case of an Ethernet (registered trademark) network. This LAG function is a function of ensuring a path redundancy and improving reliability by regarding a plurality of physically connected lines (links) as logically one line (link). This LAG function is also referred to as a port trunking function.

In a network for which reliability is demanded, a network management system is often introduced which allows monitoring failure information of individual apparatuses (for example, an Ethernet (registered trademark) switch or the like) in the network and manage a fault location. However, individual apparatuses in a network often cannot autonomically detect a failure occurring in it. As a method of confirming normality of the network in such a case, use may be made of a method of confirming whether or not a packet arrives, by software called ping. Confirmation by ping confirms normality in a network by confirming whether or not a packet arrives between terminals ending with an IP (Internet Protocol).

However, this ping issues an IP packet to a terminal etc. and confirms communication based on a response thereof but cannot directly designate an intermediate physical path in a LAG. Accordingly, in a network in which path redundancy is ensured by LAG or the like, it is difficult to grasp a state of a physical line (link) only with ping. For example, if a packet by ping did not arrive, it is difficult to identify a section where an abnormality has occurred.

Patent Literature (PTL) 1 discloses a frame transmission apparatus in a communication apparatus in which a plurality of physical ports are bundled into a logical port, wherein the frame transmission apparatus supports overall confirmation of normality of a plurality of frame transfer paths within the apparatus. The frame transmission apparatus disclosed in this literature is provided with a plurality of ports possessed by a line unit and a setting control unit. This setting control unit confirms normality of a frame transfer state within the apparatus, by transferring a maintenance frame from a first port to a second port in the apparatus. If the first port is a logical port in which a plurality of physical ports are link-aggregated, this setting control unit selects each of the plurality of physical ports as a transmission source port, and transfers a plurality of maintenance frames from a plurality of physical ports to the second port.

Patent Literature 2 discloses a detection apparatus that can achieve improvement in accuracy of detection of a section in which a failure has occurred in a network. According to this literature, the detection apparatus transmits to a storage apparatus a packet group for quality analysis including unique transmission source MAC addresses of the maximum number of links among the number of links of individual sections in a path that is a target for detection of a failure occurrence section, in accordance with a prescribed distribution rule. Next, the detection apparatus identifies, from the result transmitted, a combination of transmission source MAC addresses for which packet loss has actually occurred. Next, in a case where the quality analysis packet group is distributed to individual links in individual sections in accordance with a prescribed distribution rule, the detection apparatus identifies a group of transmission source MAC addresses in the quality analysis packets distributed to the individual links. The detection apparatus detects a failure occurrence section from a group of transmission source MAC addresses corresponding to the combination of transmission source MAC addresses where packet loss has actually occurred.

[PTL 1] Japanese Patent Kokai Publication No. 2015-2413A

[PTL 2] Japanese Patent Kokai Publication No. 2013-157957A

SUMMARY

The following analysis is given according to the present invention. The method of Patent Literature 1, however, only assumes a case where a trunk is configured for both transmission source and transmission destination of LBM.

In the method of Patent Literature 2 it is possible to detect in which section of LAG configured in a multi-stage manner a failure has occurred, but there is a problem in that it is not possible to identify in which physical link thereof the failure has occurred.

It is an object of the present invention to provide a terminal apparatus, a switch, a network system, a test method and a program that can contribute to improving efficiency of testing a logical link configured in multiple stages by using link aggregating technology as represented by link aggregation.

According to a first aspect, provided is a terminal apparatus comprising: an inspection execution part that executes an inspection by transmitting a test packet to a prescribed destination apparatus reached via a plurality of logical links, the logical link being configured by a switch having a function of aggregating a plurality of physical links between the switch and an adjacent switch to use the physical links as a logical link; and a test packet creation part that creates, based on a rule of selecting a physical link as a component of the logical link by the switch, a plurality of kinds of test packets for which a transmission source address(es) of the test packet(s) is(are) so rewritten to enable confirmation of normality of the plurality of physical links between the terminal apparatus and the prescribed destination apparatus.

According to a second aspect, provided is a switch having a function of aggregating a plurality of physical links between the switch and an adjacent switch to use the physical links as a logical link, wherein the switch selects the physical link by using a rule of selecting the physical link based on a transmission source address of a prescribed test packet and switch-unique information, and transfers the test packet.

According to a third aspect, provided is a network system including the abovementioned terminal apparatus and switch.

According to a fourth aspect, provided is a test method, wherein a terminal apparatus comprising an inspection execution part that executes an inspection by transmitting a test packet to a prescribed destination apparatus reached via a plurality of logical links, the logical link being configured by a switch having a function of aggregating a plurality of physical links between the switch and an adjacent switch to use the physical links as a logical link repeats a step of creating, based on a rule of selecting a physical link as a component of the logical link by the switch, a test packet for which a transmission source address of the test packet is so rewritten to enable confirmation of normality of the plurality of physical links between the terminal apparatus and the prescribed destination apparatus, and a step of transmitting the test packet, to confirm normality of the plurality of physical links between the terminal apparatus and the prescribed destination apparatus. This method is associated with a particular mechanism, which is a terminal apparatus that transmits the abovementioned test packet.

According to a fifth aspect, provided is a program for realizing the functionality of the abovementioned terminal apparatus, or a program for implementing the test method indicated in the abovementioned fourth aspect. It is to be noted that this program may be implemented by a computer having a memory and may be recorded (stored) on a computer-readable (non-transient) storage medium. That is, the present invention may be embodied as a computer program product.

According to the present disclosure, it is possible to improve efficiency in testing of a logical link configured in multiple stages by using link aggregating technology as represented by link aggregation.

BRIEF DESCRIPTION OF DRAWINGS

FIG. 6 is a diagram illustrating inspection patterns created by the test terminal of the first example embodiment of the present disclosure.

FIG. 8 is a diagram illustrating test results according to the inspection pattern of FIG. 6.

PREFERRED MODES

Figure 1:
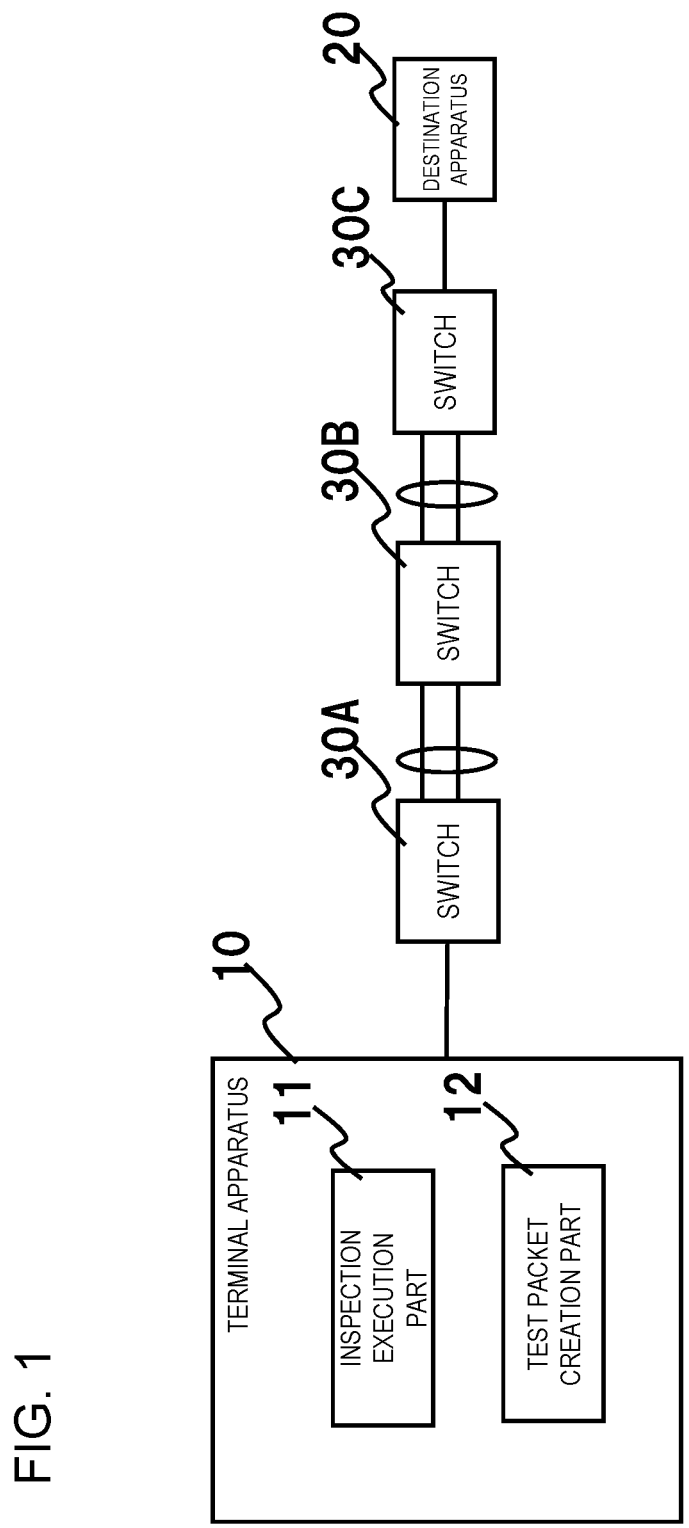
FIG. 1 is a diagram illustrating a configuration of an example embodiment of the present disclosure.

First, an outline of an example embodiment of the present disclosure will be described in reference to the drawings. It is to be noted that reference symbols added to this outline are added to individual elements for convenience, as an example for aiding understanding, and are not intended to limit the present disclosure to modes illustrated in the drawings. Further, connection lines between blocks in the diagrams referred to in the following description include both unidirectional or bidirectional. Unidirectional arrows schematically show a flow of main signals (data), but do not exclude bidirectionality.

The present disclosure, in an example embodiment thereof as shown in FIG. 1, may be implemented by a terminal apparatus 10 having an inspection execution part 11 and a test packet creation part 12. In the following description, switches 30A-30C will be explained as having a function of aggregating a plurality of physical links between the switch and an adjacent 205 switch to use the physical links as a logical link.

More specifically, the inspection execution part 11 transmits a test packet to a prescribed destination apparatus 20 reached via a plurality of logical links, the logical link being configured by a switch 30 (hereinafter referred to as "switch 30", in case the switches 30A-30C are not particularly distinguished), and executes an inspection.

The test packet creation part 12, in the inspection, creates a plurality of kinds of test packets for which a transmission source address(es) of the test packet(s) is(are) so rewritten to enable confirmation of normality of the plurality of physical links between the apparatus and a prescribed destination apparatus.

For example, assume that a selection rule of a physical link in the logical link between the switch 30A and the switch 30B is to select a physical link according to whether the value of the 4th byte of a transmission source address of a packet header is odd or even. Similarly, a assume that a selection rule of a physical link in the logical link between the switch 30B and the switch 30C is to select a physical link according to whether the value of the 3rd byte of a transmission source address of a packet header is odd or even.

Figure 2:
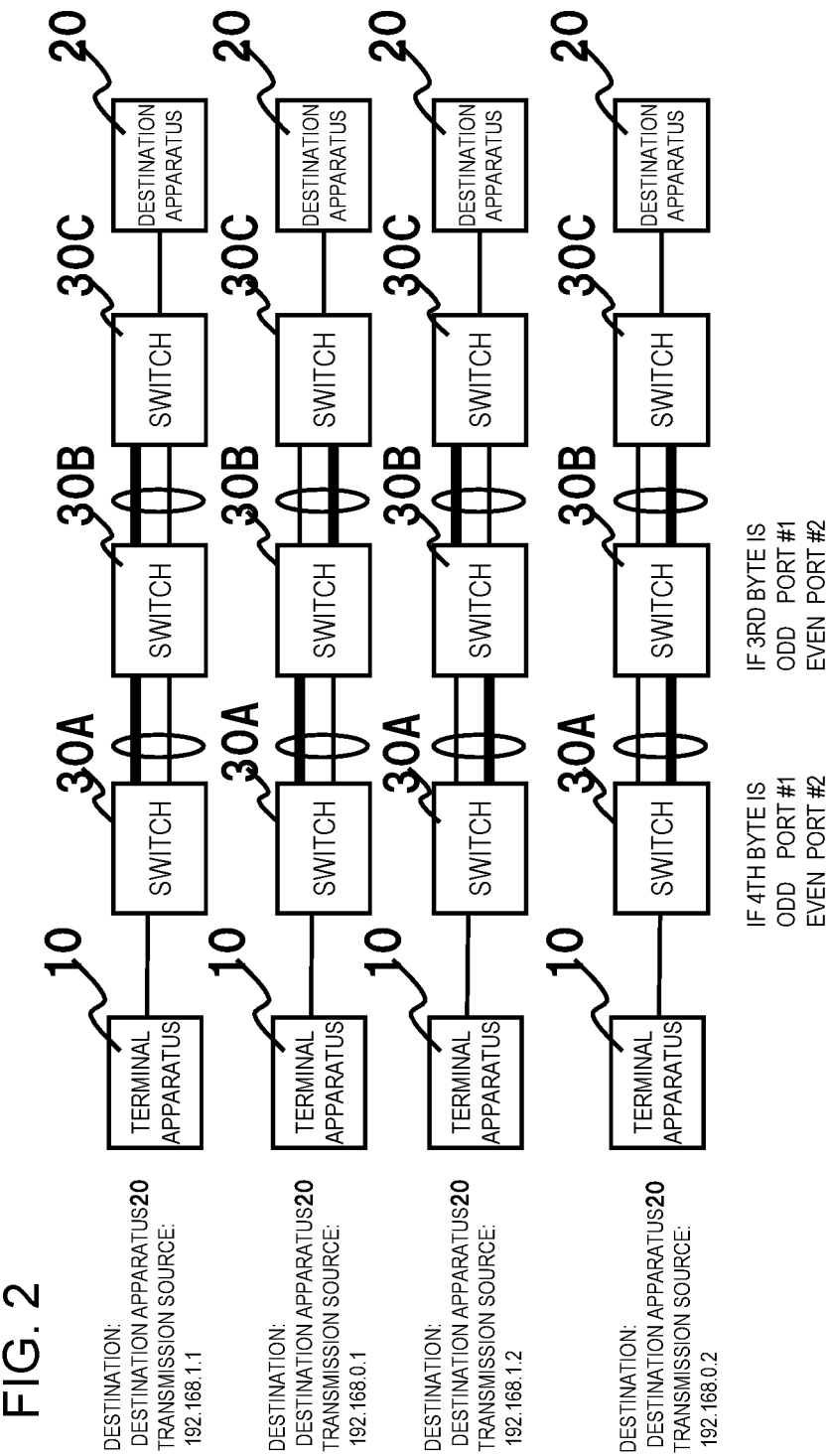
FIG. 2 is a diagram illustrating operations of an example embodiment of the present disclosure.

In this case, the test packet creation part 12 creates test packets whose packet headers are rewritten with 4 kinds of combinations where the 3rd byte and 4th byte of the transmission source address are each odd or even, as shown on the left side of FIG. 2. And the inspection execution part 11 performs a communication inspection with the destination apparatus 20, using the test packets created by the test packet creation part 12. It is to be noted that the abovementioned and 4th bytes are an example for describing the present disclosure, and other positions of the transmission source address may also be used as reference fields of the switch 30.

In this way, test packets are transmitted in the paths as shown by the bold lines in FIG. 2. For example, assume that among 4 test packets whose transmission source addresses were changed, the 2 patterns of the upper stages with transmission source addresses of 192.168.1.1 and 192.168.0.1 were of non-delivery of packet. In this case, if multi-failure or failure of the switch 30 itself is not considered, it is turned out that there is a problem in the upper physical link in FIG. 2 as an element of the logical link between the switch 30A and the switch 30B.

Likewise, for example, assume that among 4 test packets, the 2nd and 4th patterns with transmission source addresses of 192.168.0.1 and 192.168.0.2, respectively, were of non-delivery of packet. In this case, if multi-failure or failure of the switch 30 itself is not considered, it is turned out that there is a problem in the lower physical link in FIG. 2 as an element of the logical link between the switch 30B and the switch 30C.

As described above, according to the present example embodiment, it is possible to improve efficiency of test of a logical link(s) configured in multiple stages by using a link aggregating technology as represented by link aggregation.

First Exemplary Embodiment

Figure 3:
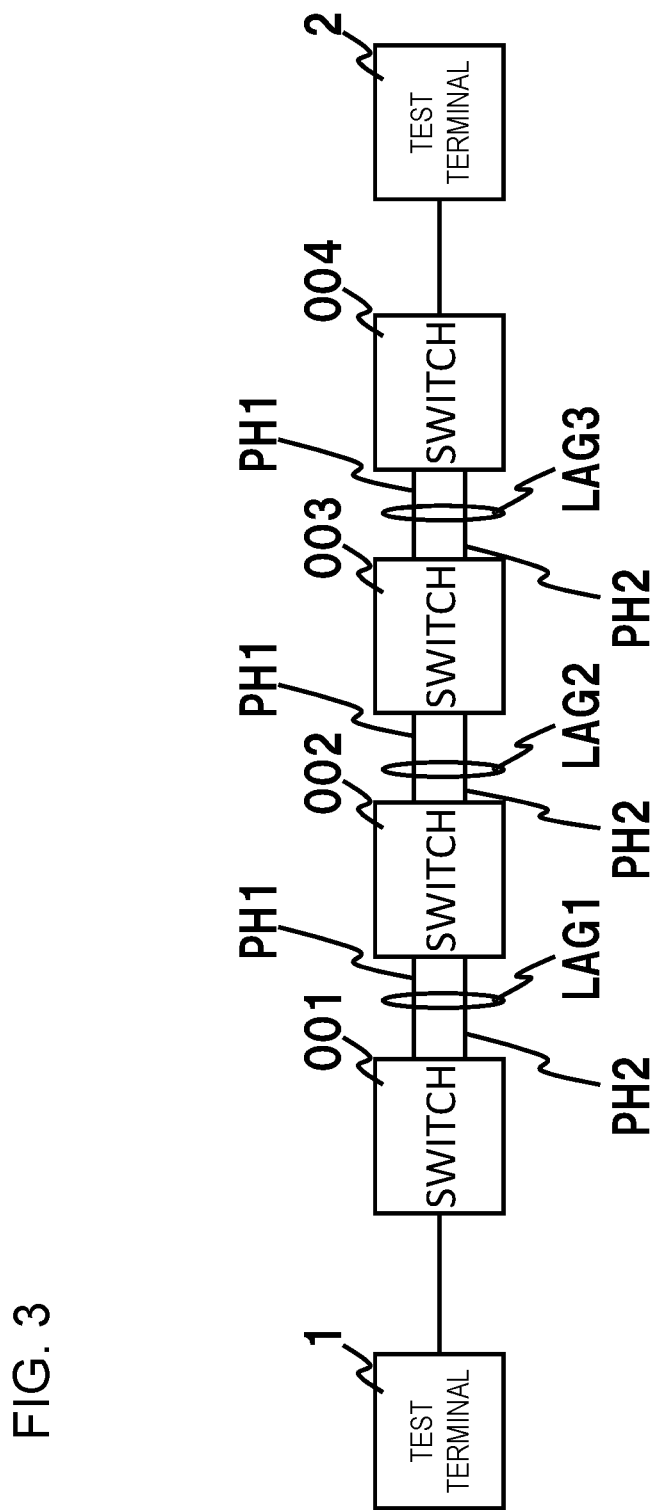
FIG. 3 is a diagram illustrating a configuration of a first example embodiment of the present disclosure.

Subsequently, a first example embodiment of the present disclosure will be described in detail in reference to the drawings. FIG. 3 is a diagram illustrating an overall configuration of the first example embodiment of the present disclosure. Referring to FIG. 3, a configuration is illustrated that includes serially connected switches 001 to 004 each of which a unique identifier is assigned to, a test terminal 1 provided at an end of the switch, and a test terminal 2 that responds to a ping packet from the test terminal 1. It is to be noted that in the present example embodiment the test terminal 1 and the ping packet correspond to the abovementioned terminal apparatus and test packet, respectively.

Two physical links PH1 and PH2 are provided between every adjacent two of the switches 001 to 004. Using these physical links PH1, PH2, LAG1 to LAG3 (corresponding to the logical links) are configured between switches 001 to 004. It is to be noted that in the example of FIG. 3, the switches 001 to 004 are directly connected in series, but other switch(es) may be present between the switches 001 to 004. The following description assumes that the identifiers of the switches 001 to 004 are 001 to 004 and these are used as switch-unique information.

Figure 4:
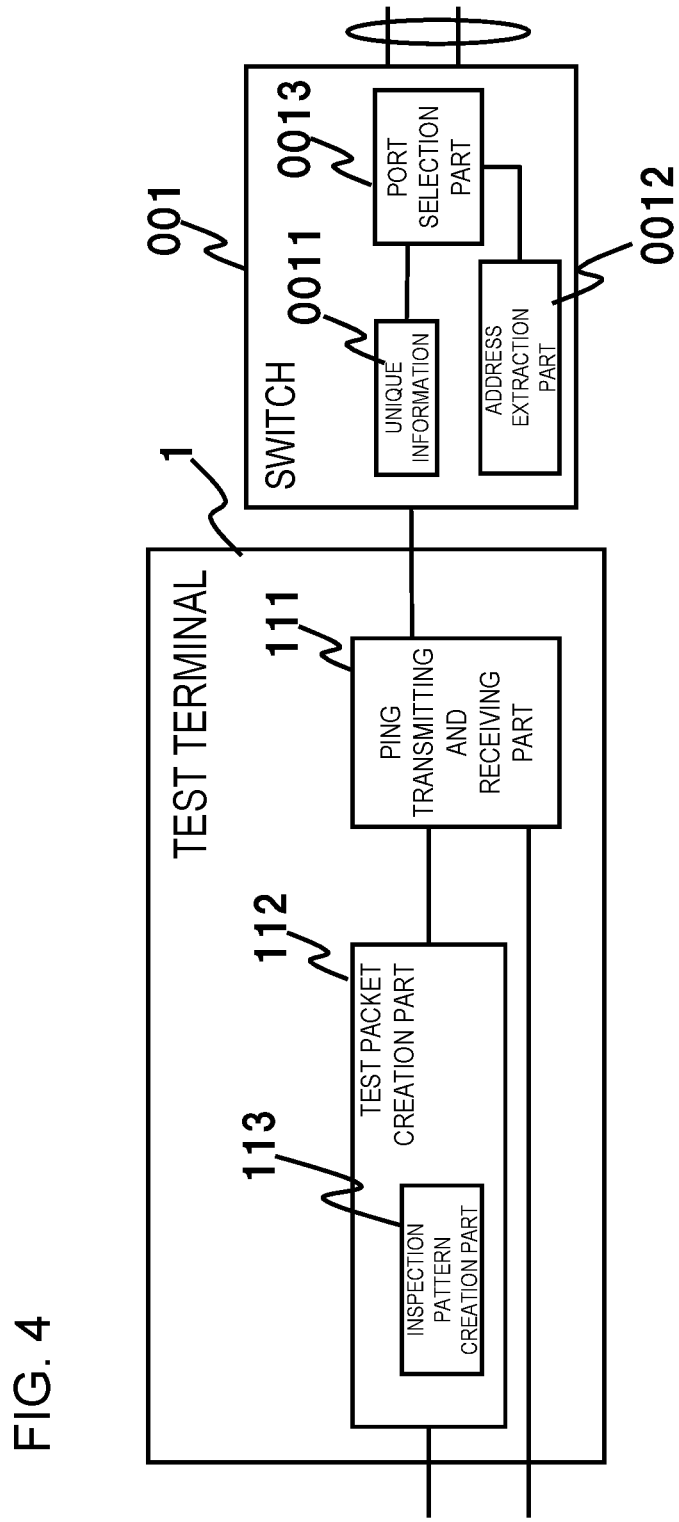
FIG. 4 is a functional block diagram illustrating configurations of a test terminal and a switch in the first example embodiment of the present disclosure.

FIG. 4 is a functional block diagram illustrating configurations of a test terminal and a switch in the first example embodiment of the present disclosure. As shown in FIG. 4, the switch 001 is provided with an address extraction part 0012 that extracts a transmission destination address and a transmission source address from a received packet, and a port selection part 0013. The port selection part 0013 selects a LAG configuration line (physical link) based on an address extracted in the address extraction part 0012 and unique information 0011. It is to be noted that since the configurations of the switches 002 to 004 are similar to that of the switch 001, a description thereof is omitted. As this type of switch, an Ethernet (registered trademark) switch configuring an Ethernet (registered trademark) network may be enumerated.

In the present example embodiment, assume that the port selection part 0013 selects a LAG configuration line (physical link) based on the following rule (algorithm) (hereinafter, this rule is also referred to as "port selection rule"). Assume that the other switches 002 to 004 also select a LAG configuration line (physical link) based on a similar rule.
(1) A character string is created in which a transmission destination address and a transmission source address of a received packet and a switch identifier number is combined.
(2) A hash calculation is made to the character string by MD5 (Message Digest Algorithm 5).
(3) In a case of a hash value obtained by the MD5 being even, the physical link (PH1) is selected, and in a case of being odd, the physical link (PH2) is selected.

For example, assume that the switch 001 receives the following packet.
Transmission destination address 010.000.000.001
Transmission source address 192.168.000.001

In the present example embodiment, the switch identifier number 001 is used as unique information. As unique information, it is also possible to use a MAC address (Media Access Control address) assigned to a switch, of course.

A character string in which those are combined is "010000000001192168000001001". By performing an MD5 conversion of this character string, "4b9c5d865b8e5ce0f04cf41936fbeee4" is obtained. In this case, since the hash value by MD5 is even, the port selection part 0013 selects the physical link 1 (PH1) and transfers the received packet.

Subsequently, the test terminal 1 that performs an inspection of a switch that transfers a packet as described above will be described. As shown in FIG. 4, the test terminal 1 is provided with a ping transmitting and receiving part 111, and a test packet creation part 112.

The ping transmitting and receiving part 111 confirms a communication state of the switches 001 to 004 by transmitting a ping packet to the test terminal 2 and receiving a response packet thereof. On this occasion, the ping transmitting and receiving part 111 transmits a ping packet in which the transmission source address received from the test packet creation part 112 has been rewritten. Therefore, the ping transmitting and receiving part 111 corresponds to the abovementioned inspection execution part 11.

The test packet creation part 112 is provided with an inspection pattern creation part 113. The inspection pattern creation part 113 stores connection topology information of switch and a rule (algorithm) similar to that of the abovementioned switch, and creates based on the content thereof a plurality of inspection patterns in which the transmission source addresses are changed. On receiving a ping request from a maintainer etc., the test packet creation part 112 uses a transmission source address created as the inspection pattern to create a ping packet and requests the ping transmitting and receiving part 111 to do transmission.

Figure 5:
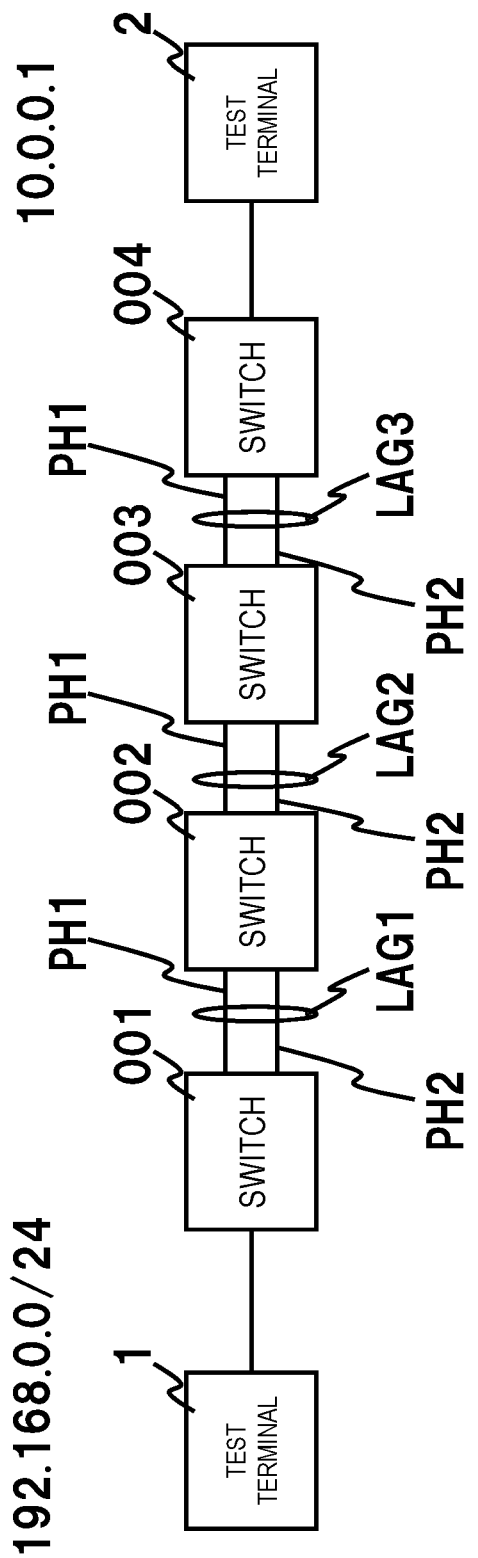
FIG. 5 is a diagram illustrating operations of the first example embodiment of the present disclosure.

For example, assume that, as shown in FIG. 5, the test terminal 1 receives a ping request where a transmission source IP address is 192.168.0.0/24 and a transmission destination IP address is 10.0.0.1 from a maintainer. In this case, the inspection pattern creation part 113 creates the following transmission source IP address.
192.168.0.1 192.168.0.6
192.168.0.2 192.168.0.7
192.168.0.3 192.168.0.8
192.168.0.4 192.168.0.18

FIG. 6 shows sections inspectable by the abovementioned 8 transmission source addresses. Section 1, section 2 and section 3 of FIG. 6 correspond to LAG1, LAG2 and LAG3, respectively, of FIG. 5. As shown in the section 1 to the section 3 of FIG. 6, it is possible to exhaustively cover all routes between the test terminal 1 and the test terminal 2 of FIG. 5, by combining unique information of the individual switches. It is to be noted that in the example of FIG. 6, there are 2×2×2=8 combinations of transmission source IP addresses, but this number depends on the number of physical lines (physical links) configuring a logical link. For example, in a case where there are respectively 3 physical links between LAG1 and LAG2 and LAG3, there are 3×3×3=27 combinations of the transmission source IP addresses.

It is to be noted that with such inspection patterns may be created by the inspection pattern creation part 113 each time of ping request, or may be set in advance on network construction etc. The abovementioned example has been described as one that the inspection pattern creation part 113 creates an inspection pattern(s) based on connection topology information of switches and a port selection rule (algorithm) for the abovementioned switch, but there is no limitation to this mode. For example, it is possible to use a configuration in which creation of inspection patterns per se is performed by another apparatus and the inspection patterns are held in the inspection pattern creation part 113.

Figure 7:
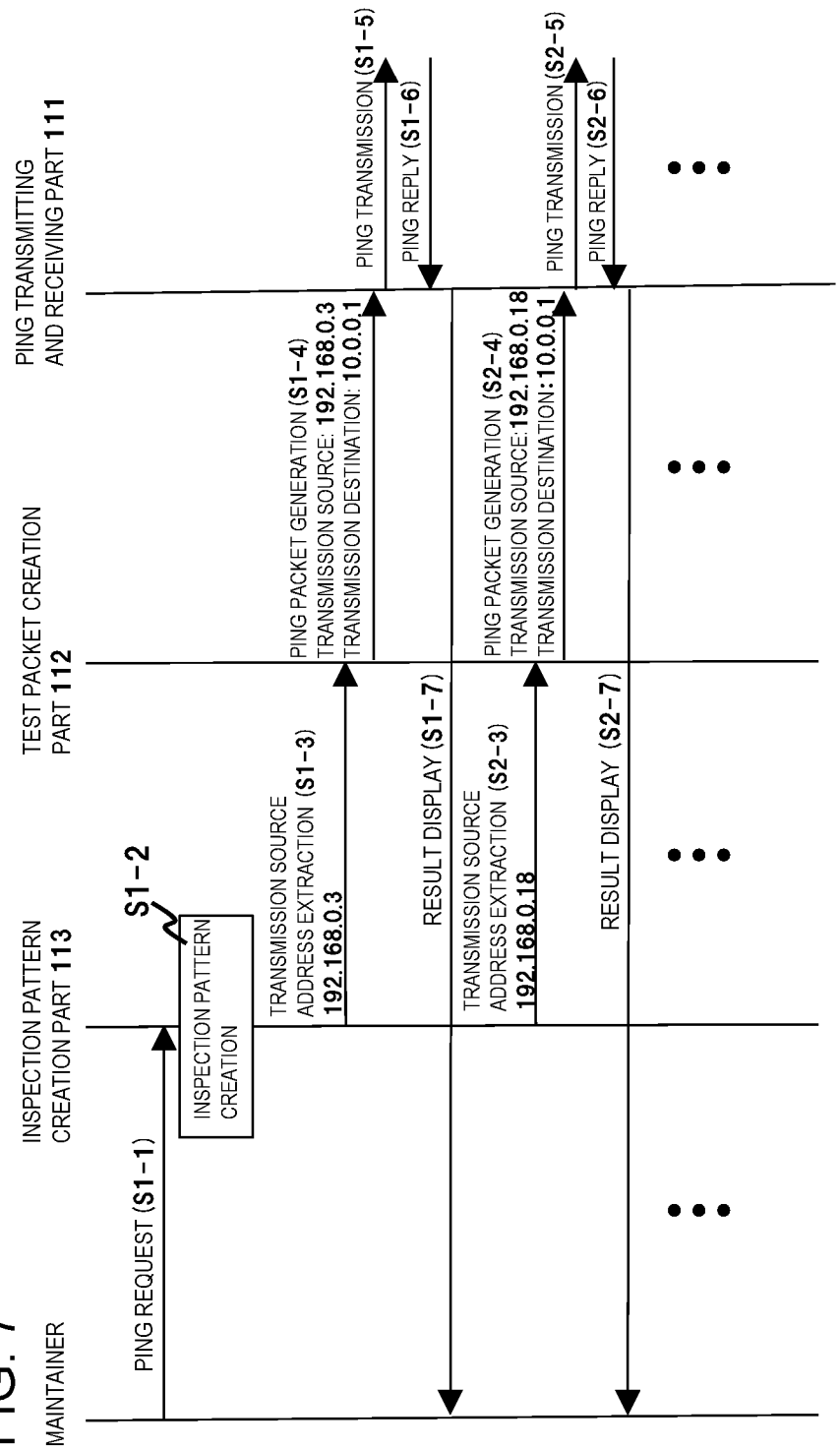
FIG. 7 is a sequence diagram representing operations of the first example embodiment of the present disclosure.

Subsequently, operations of the present example embodiment will be described in detail in reference to the drawings. FIG. 7 is a sequence diagram representing operations of the test terminal 1 of the present example embodiment. Referring to FIG. 7, first the maintainer manipulates the test terminal 1, and makes a ping request by designating a transmission destination (step S1-1). Here assume that the maintainer selects the test terminal 2 having IP address 10.0.0.1 in FIG. 5.

Next, the inspection pattern creation part 113 within the test packet creation part 112 creates an inspection pattern (step S1-2). Specifically, the inspection pattern creation part 113 creates an inspection pattern shown in FIG. 6, based on an IP address of the test terminal 2 designated by the maintainer, a port selection rule (algorithm) with regard to the abovementioned switch, and LAG information on a path from the test terminal 1 to the test terminal 2.

Next, the test packet creation part 112 retrieves 1 pattern from the created inspection patterns, creates a test packet using the transmission source IP address thereof, and transmits same to the ping transmitting and receiving part 111 (steps S1-3, S1-4). For example, in step S1-3 of FIG. 7, transmission source IP address 192.168.0.3 is retrieved, and a test packet is created.

Next, the ping transmitting and receiving part 111 transmits a ping packet sent from the test packet creation part 112 to the switch 001 side (step S1-5).

When the ping packet reaches the test terminal 2, the test terminal 2 returns a ping reply packet. On receiving this ping reply packet (step S1-6), the ping transmitting and receiving part 111 displays a result thereof on a display apparatus of the test terminal etc. (step S1-7).

The inspection pattern creation part 113 repeats the abovementioned processing until the test packet creation ends for all patterns of the inspection patterns. For example, in step S2-3 of FIG. 7, transmission source IP address 192.168.0.18 is retrieved, and a test packet is created. Finally, a ping packet using transmission source IP address 192.168.0.4 of FIG. 6 is transmitted, and a series of tests ends at the stage of receiving the ping reply packet.

FIG. 8 shows test results using the inspection patterns of FIG. 6. In this case, since communication has failed for the pattern using the physical link 2 (PH2) in section 2, it is possible to identify the physical link 2 (PH2) as a failure suspect location (refer to the broken line circles in FIG. 8).

As described above, according to the present example embodiment, it is possible to efficiently perform test of logical links configured in multiple stages by using a link aggregating technology.

It is to be noted that in the port selection rule (algorithm) on the switch side in the abovementioned example embodiment, a MAC address may be used instead of an IP address. In this case, the inspection pattern creation part 113 creates an inspection pattern using a transmission source MAC address. The test packet creation part 112 creates a test packet using a received transmission source MAC address.

In the port selection rule (algorithm) on the switch side, if IP address and MAC address are used together or if other information elements are related thereto, the inspection pattern creation part 113 creates an inspection pattern using such information.

Second Exemplary Embodiment

In the abovementioned first example embodiment, reference was not made to a path of the ping response packet, but a case is assumed where transfer paths of a ping packet and a ping reply packet are different from one another, according to a port selection rule (algorithm) on the switch side.

Figure 9:
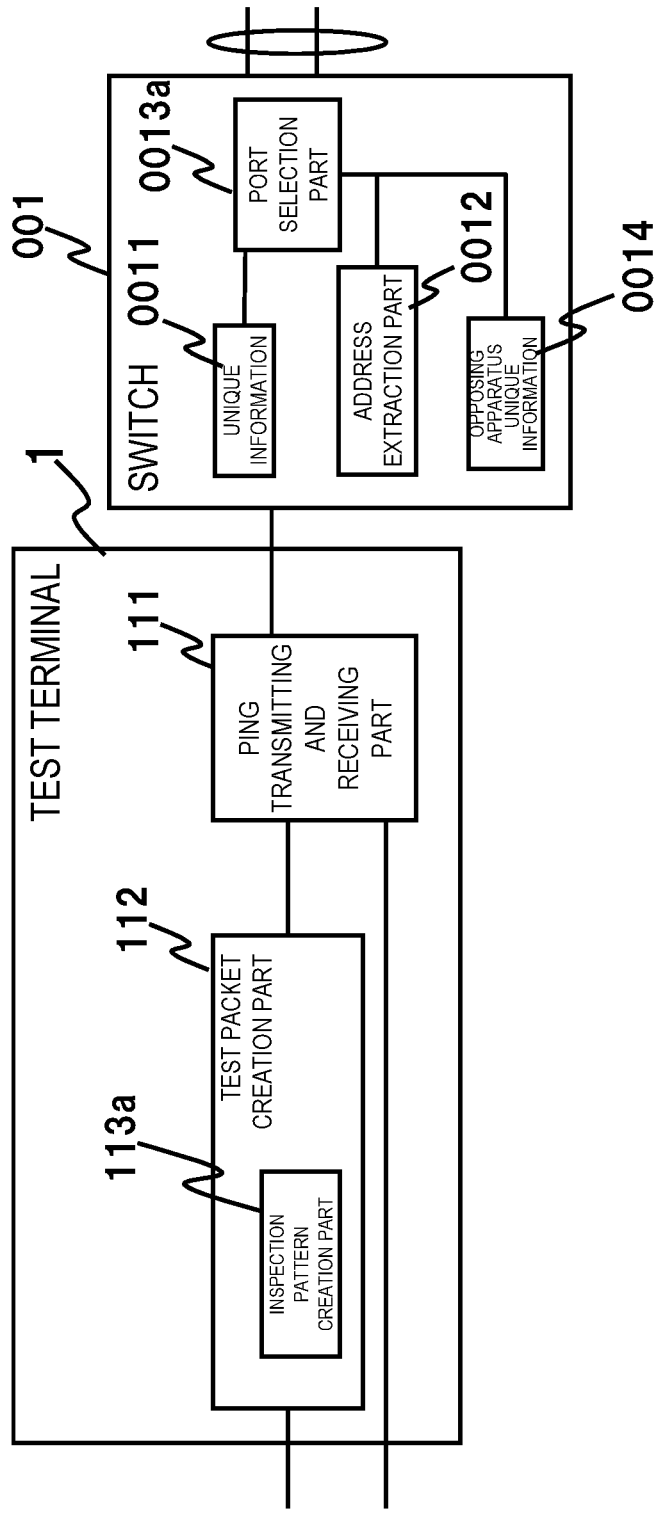
FIG. 9 is a functional block diagram illustrating configurations of a test terminal and a switch in a second example embodiment of the present disclosure.

Accordingly, a description is given of a second example embodiment so configured that transfer paths of a ping packet and a ping reply packet are the same. FIG. 9 is a diagram illustrating a configuration of the second example embodiment of the present disclosure. The configuration thereof is different from that of the first example embodiment illustrated in FIG. 4 in that a switch 001 holds unique information of an opposing apparatus of LAG (in the case of FIG. 5, the switch 002), and that the port selection part 0013 is replaced with a port selection part 0013a. Further, correspondingly, the inspection pattern creation part 113 on the test terminal 1 side is replaced with an inspection pattern creation part 113a, and an inspection pattern creation logic thereof is changed. Since the other configurations and operations are the same as the first example embodiment, the different points will be mainly described below.

The port selection part 0013a of the present example embodiment uses, as unique information used in a port selection rule (algorithm), not only an identifier of the self-apparatus, but also identifier information (opposing apparatus unique information 0014) of an opposing apparatus of a LAG connection. Specifically, the port selection part 0013a selects a physical link used in transfer by using such a rule as to select the same physical line even if identifiers of the self-apparatus and the opposing apparatus and a transmission destination address and a transmission source address are switched.

An example of a port selection rule (algorithm) in the present example embodiment is illustrated.
(0) A switch prepares 4 items of information: a transmission destination address of a ping packet, a transmission source address of a ping packet, unique information of a self-apparatus, and unique information of an opposing apparatus.
(1) These 4 items of information are combined in the following order and a character string(s) is(are) created.
lower number (smaller value) among a transmission destination address and a transmission source address
higher number (larger value) among a transmission destination address and a transmission source address
lower number (smaller value) among unique information of the self-apparatus and unique information of an opposing apparatus
higher number (larger value) among unique information of the self-apparatus and unique information of an opposing apparatus In a case of this order, if the same transmission destination address, transmission source address, self-apparatus itself and opposing apparatus are combined, the character strings match with each other.
(2) The character string is subjected to a hash calculation based on MD5 (Message Digest Algorithm 5).
(3) In case of a hash value obtained by the MD5 being even, a physical link 1 (PH1) is selected, and in case of being odd, a physical link 2 (PH2) is selected.

For example, assume that the switch 002 receives the following packet from the switch 001.
Transmission destination address: 192.168.000.001
Transmission source address: 010.000.000.001

The unique information of the switch 002 is a switch identifier number 002, and the unique information of the switch 001, which is an opposing apparatus, is a switch identifier number 001.

A character string in which those are combined is "010000000001192168000001001002". Performing MD conversion of this character string, a value of "2b94de09c29327a5ed84283dab66100c" is obtained. In this case, since the hash value by MD5 is even, the port selection part 0013a selects the physical link 1 (PH1) with regard to LAG1, and transfers a received packet.

Likewise, for example, when the switch 002 transfers a packet to the switch 001, since the abovementioned character string does not change, the port selection part 0013a selects the physical link 1 (PH1) for LAG1, and transfers a received packet.

As described above, according to the present example embodiment, identification of failure locations is facilitated since the transfer paths of a ping packet and a ping reply packet are the same.

Third Exemplary Embodiment

The abovementioned first example embodiment has been described as the one that the inspection pattern creation part 113 automatically creates an inspection pattern covering thorough paths between the test terminal 1 and the test terminal 2, but it is possible to use also a mode where a maintainer is allowed to select a path. Below, a description is given concerning a third example embodiment where a maintainer can select a path (combination of physical links) of a test target. It is to be noted that since the third example embodiment can be implemented by a configuration similar to those of the first and second example embodiments, differences in operation between them will be mainly described below.

Figure 10:
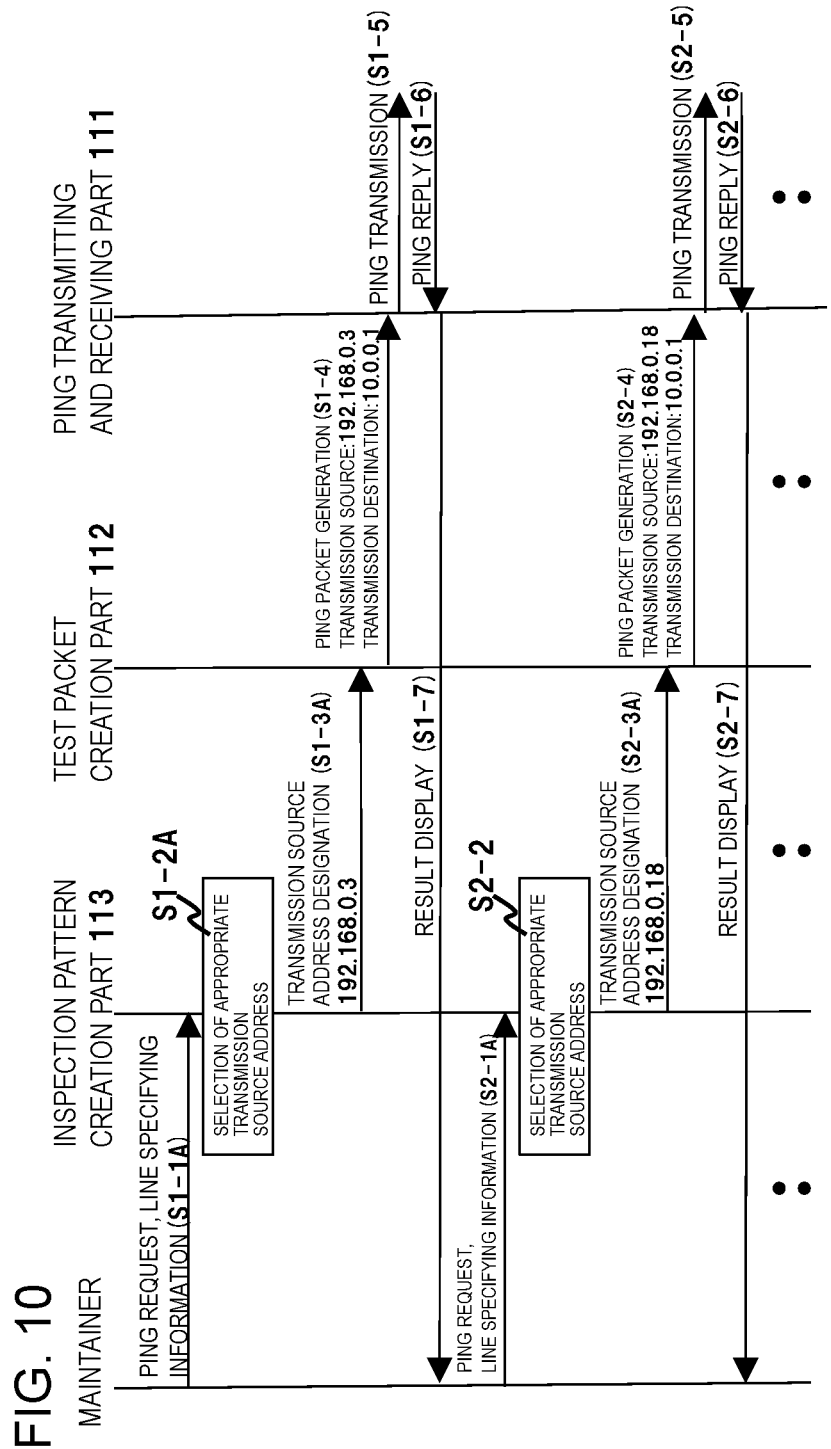
FIG. 10 is a diagram for illustrating operations of the third example embodiment of the present disclosure.

FIG. 10 is a diagram for describing operations of the third example embodiment of the present disclosure. A difference from the first example embodiment illustrated in FIG. 7 is that, when a maintainer makes a ping request, it is possible to set line specifying information (step S1-1A). Here, the line specifying information is information specifying which physical link is used as a test target, in each of a section 1 to a section 3 in FIG. 6. For example, it is specified in FIG. 6 that the section 1=1, the section 2=1 and the section 3=1.

Next, the inspection pattern creation part 113 retrieves an entry matching with the line specifying information from the inspection patterns shown in FIG. 6, and selects its transmission source address. In a case where it is specified that the section 1=1, the section 2=1 and the section 3=1 in FIG. 6, the inspection pattern creation part 113 selects from the inspection patterns in FIG. 6 the top entry whose line combination matches therewith. The inspection pattern creation part 113 instructs the inspection pattern creation part 113 [sic. the test packet creation part 112] to create a test packet for which 192.168.0.3, which is the transmission source IP address of this entry, is taken as the transmission source (step S1-3A).

Next, the test packet creation part 112 generates a test packet using the instructed transmission source IP address, and transmits same to the ping transmitting and receiving part 111 (steps S1-4). Operations from the following step to S1-7 are the same as in the first example embodiment. In this way, a maintainer can confirm normality of the specified path.

By making a ping request by specifying a next line specifying information, a maintainer can continue confirming normality of the specified path (step S2-1A to S2-7).

As described above, the present disclosure can be modified to such a configuration that a maintainer specifies a path for a test target.

As mentioned above, the individual example embodiments of the present disclosure have been described. However, the present disclosure is not limited to the abovementioned example embodiments, and can undergo further modifications, substitutions and adjustments within a scope that does not depart from the fundamental technical concepts of the present disclosure. For example, the network configurations, the configurations of the individual elements, and expression forms of the rule etc. shown in the individual drawings are examples for the purpose of aiding understanding of the present disclosure and are not intended to limit the present disclosure to the configurations illustrated in the drawings. Further, in the following description, "A and/or B" is used to mean at least either one of A and B.

Furthermore, the abovementioned example embodiments have been described as the ones that one set of test terminals are used. However, in a case of a large network, there may be wide-ranging paths within a LAG. In such a case, since sets of inspection patterns or transmission source addresses used therein, too, become enormous, it is preferable to use 2 or more sets of test terminals. In this way, by reducing the number of inspection patterns per set, it is possible to reduce the number of sets of transmission source addresses.

Moreover, the abovementioned example embodiments have been described as the ones that MD5 is used for calculation of a hash value, but it is also possible that a hash value using another algorithm or a value for selection of physical link instead of them are calculated and used. The abovementioned example embodiments have been described using the example where each LAG is configured by 2 physical links (physical lines), but the number of physical links (physical lines) configuring each LAG is not limited. Also in a case where 3 or more physical links (physical lines) configures a LAG, it is possible to select a physical link (physical line) using a value that uses the abovementioned MD5 or the like. In this case, a physical link (physical line) may be selected not based on whether a hash value is odd or even, but based on a residual value (remainder) of dividing a hash value by the number of physical links (physical lines).

In addition, the abovementioned example embodiments have been described using the example in which ping is used as a test packet, but a type of test packet is not limited to ping. It is also possible to apply the configurations of the abovementioned first to third example embodiments to a communication confirmation by another protocol.

Figure 11:
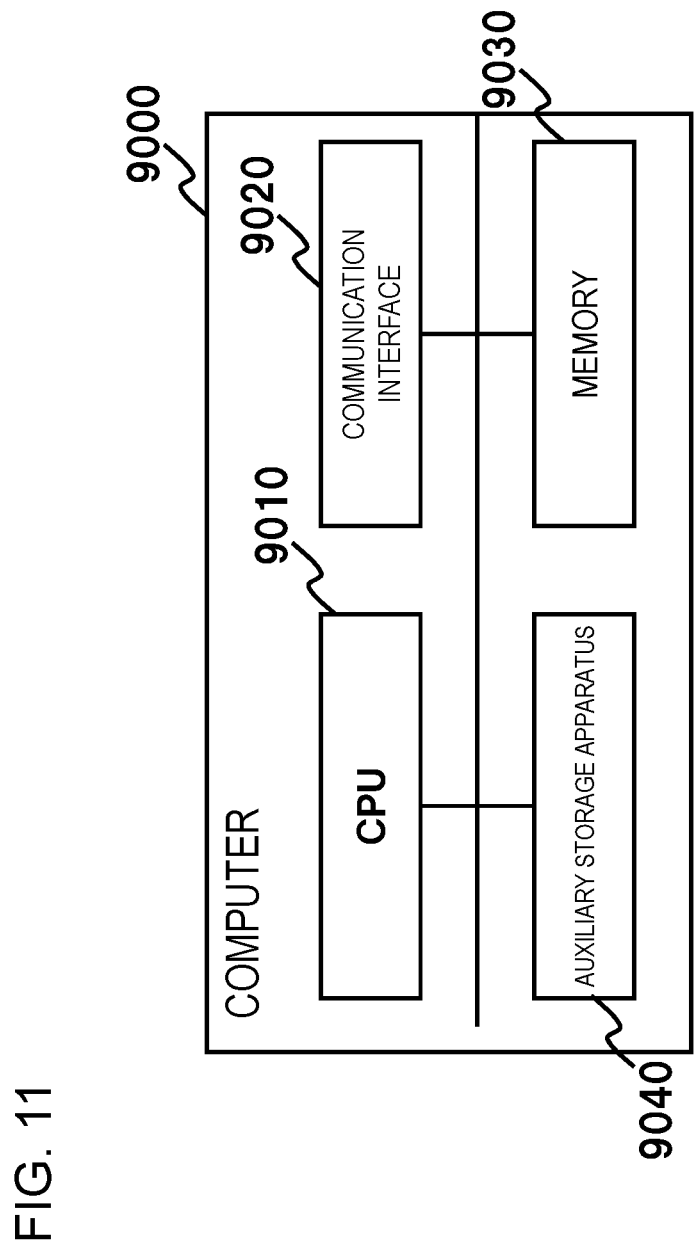
FIG. 11 is a diagram illustrating a configuration of a computer as an element of the test terminal of the present disclosure.

Further, the procedures illustrated in the abovementioned first to third example embodiments can be realized by a program that allows a computer (9000 in FIG. 11) which functions as a terminal apparatus or a switch to realize the functionality of these apparatuses. Such a computer is exemplified by a configuration having a CPU (Central Processing Unit) 9010, a communication interface 9020, a memory 9030, and an auxiliary storage apparatus 9040 in FIG. 11. That is, it is possible to use such a configuration that allows the CPU 9010 of FIG. 11 to execute an inspection pattern creation program or a test packet creation program.

Hence, the individual parts (processing means, functions) of the terminal apparatuses and switches illustrated in the abovementioned first to third example embodiments can be implemented by a computer program which allows a processor installed in these apparatuses to execute the abovementioned individual processes, using a hardware thereof.

Finally, preferred modes of the present disclosure are summarized.

First Mode (Refer to the terminal apparatus according to the first aspect described above.)

Second Mode

As the rule, a rule may be used which selects the physical link based on a transmission source address of the test packet and switch-unique information.

Third Mode

As the rule, a rule may be used which selects the physical link using a hash value of information in which a transmission destination address, a transmission source address of the test packet and switch-unique information are combined.

Fourth Mode

The test packet creation part of the terminal apparatus preferably comprises an inspection pattern creation part that creates an inspection pattern(s) in which a transmission source address(es) of the test packet(s) is(are) changed so as to cover thorough combinations of physical links selected by the switch on a path to the prescribed destination apparatus based on the rule.

Fifth Mode

The test packet creation part of the terminal apparatus may have a configuration to select from the inspection pattern a transmission source address corresponding to a combination of physical links on a test path designated together with a transmission designation for the test packet, and to create the test packet.

Sixth Mode

As the rule, a rule may be used that, for a response packet of the test packet, the same link as that of the test packet is selected.

Seventh Mode (Refer to the network system according to the second aspect described above.)

Eighth Mode (Refer to the switch according to the third aspect described above.)

Ninth Mode (Refer to the test method according to the fourth aspect described above.)

Tenth Mode (Refer to the program according to the fifth aspect described above.) It is to be noted that the seventh to tenth modes described above may be developed to the second to sixth modes, as is the case of the first mode.

It is to be noted that the individual disclosures of the abovementioned Patent Literatures are incorporated herein by reference thereto. Modifications and adjustments of example embodiments and examples may be made within the scope of the entire disclosure (including the scope of the claims) of the present invention, and also based on fundamental technical concept thereof. Various combinations and selections of various disclosed elements (including individual elements of each claim, individual elements of each example embodiment and example, individual elements of each drawing and the like) are possible within the scope of the disclosure of the present invention. That is, it is self-explanatory that the present invention includes various types of transformations and modifications that a person skilled in the art can realize according to the entire disclosure including the Claims and the technical concept thereof. In particular, with regard to numerical ranges described in the present specification, arbitrary numerical values and small ranges included in the relevant ranges should be interpreted to be specifically described even if there is no particular description thereof.

REFERENCE SIGNS LIST

001-004 switch
0011 unique information
0012 address extraction part
0013, 0013a port selection part
0014 opposing apparatus unique information
1, 2 test terminal
10 terminal apparatus
11 inspection execution part
12, 112 test packet creation part
20 destination apparatus
30, 30A-30C switch
111 ping transmitting and receiving part
113, 113a inspection pattern creation part
9000 computer
9010 CPU
9020 communication interface
9030 memory
9040 auxiliary storage apparatus

The invention claimed is:

1. A terminal apparatus, comprising:
a memory storing one or more instructions; and
a processor configured to execute the one or more instructions to implement:
an inspection execution part that executes an inspection of communication between the terminal apparatus and a destination apparatus using a test packet; and
a test packet creation part that creates a plurality of test packets for which one or more transmission source addresses of the test packet are rewritten to enable confirmation of normality of a plurality of physical links between the terminal apparatus and the destination apparatus,
wherein inspection execution part transmits the plurality of test packets to the destination apparatus via a plurality of logical links, each of the plurality of logical links being established by a switch having a function of selecting one or more of the plurality of physical links between the switch and an adjacent switch to use as a logical link, and wherein the plurality of test packets are created based on a rule for selecting, by the switch, the one or more of the plurality of physical links as the logical link.

2. The terminal apparatus according to claim 1, wherein the rule is a rule of selecting the one or more physical links based on the one or more transmission source addresses of the test packet and switch-unique information.

3. The terminal apparatus according to claim 2, wherein the rule is a rule of selecting the one or more physical links using a hash value of information in which a transmission destination address, the one or more transmission source addresses of the test packet and switch-unique information are combined.

4. The terminal apparatus according to claim 2, wherein the test packet creation part comprises an inspection pattern creation part that creates one or more inspection patterns, in which the one or more transmission source addresses of the test packet are rewritten to cover thorough combinations of physical links selected by a plurality of switches on a path to the destination apparatus based on the rule.

5. The terminal apparatus according to claim 4, wherein the test packet creation part creates the plurality of test packets by selecting from the one or more inspection patterns, a transmission source address corresponding to a combination of physical links on a test path designated together with a transmission designation for the test packet.

6. The terminal apparatus according to claim 1, wherein, as the rule, a rule is used that, for a response packet with respect to the test packet, the same link as that of the test packet is selected.

7. A network system, comprising:
a switch that has a function of selecting one or more physical links between the switch and an adjacent switch, among a plurality of physical links, as a logical link; and
a terminal apparatus comprising:
a memory storing one or more instructions; and
a processor configured to execute the one or more instructions to implement:
an inspection execution part that executes an inspection of communication between the terminal apparatus and a destination apparatus using a test packet; and
a test packet creation part that creates a plurality of test packets for which one or more transmission source addresses of the test packet are rewritten to enable confirmation of normality of the plurality of physical links between the terminal apparatus and the prescribed destination apparatus,
wherein inspection execution part transmits the plurality of test packets to the destination apparatus via a plurality of logical links, each of the plurality of logical links being established by the switch, and
wherein the plurality of test packets are created based on a rule for selecting, by the switch, the one or more physical links as the logical link.

8. The network system according to claim 7, wherein the rule is a rule of selecting the one or more physical links based on the one or more transmission source addresses of the test packet and switch-unique information.

9. The network system according to claim 8, wherein the rule is a rule of selecting the one or more physical links using a hash value of information in which a transmission destination address, the one or more transmission source addresses of the test packet and switch-unique information are combined.

10. The network system according to claim 7, wherein the test packet creation part comprises an inspection pattern creation part that creates one or more inspection patterns, in which the one or more transmission source addresses of the test packet are rewritten to cover thorough combinations of physical links selected by a plurality of switches on a path to the destination apparatus based on the rule.

11. The network system according to claim 10, wherein the test packet creation part creates the plurality of test packets by selecting from the one or more inspection patterns, a transmission source address corresponding to a combination of physical links on a test path designated together with a transmission designation for the test packet.

12. The network system according to of claim 7, wherein, as the rule, a rule is used that, for a response packet with respect to the test packet, the same link as that of the test packet is selected.

13. A computer-readable, non-transient storage medium recording a program causing a computer installed in a terminal apparatus to implement:
an inspection execution part that executes an inspection of communication between the terminal apparatus and a destination apparatus using a test packet and
a test packet creation part that creates a plurality of test packets for which one or more transmission source addresses of the test packet are rewritten to enable confirmation of normality of the plurality of physical links between the terminal apparatus and the prescribed destination apparatus,
wherein inspection execution part transmits the plurality of test packets to the destination apparatus via a plurality of logical links, each of the plurality of logical links being established by the switch, and
wherein the plurality of test packets are created based on a rule for selecting, by the switch, the one or more physical links as the logical link.

14. The storage medium according to claim 13, wherein the rule is a rule of selecting the one or more physical links based on the one or more transmission source addresses of the test packet and switch-unique information.

15. The storage medium according to claim 14, wherein the rule is a rule of selecting the one or more physical links using a hash value of information in which a transmission destination address, the one or more transmission source addresses of the test packet and switch-unique information are combined.

16. The storage medium according to claim 13, wherein the test packet creation part comprises an inspection pattern creation part that creates one or more inspection patterns, in which the one or more transmission source addresses of the test packet are rewritten to cover thorough combinations of physical links selected by a plurality of switches on a path to the destination apparatus based on the rule.

17. The storage medium according to claim 16, wherein the test packet creation part creates the plurality of test packets by selecting from the one or more inspection patterns a transmission source address corresponding to a combination of physical links on a test path designated together with a transmission designation for the test packet.

18. The storage medium according to claim 13, wherein, as the rule, a rule is used that, for a response packet with respect to the test packet, the same link as that of the test packet is selected.

* * * * *